(12) United States Patent
Mori et al.

(10) Patent No.: US 6,712,514 B2
(45) Date of Patent: Mar. 30, 2004

(54) HYDRODYNAMIC BEARING UNIT

(75) Inventors: Natsuhiko Mori, Kuwana (JP);
Yoshinobu Akamatsu, Kuwana (JP);
Kazuo Okamura, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/925,830

(22) Filed: Aug. 9, 2001

(65) Prior Publication Data

US 2002/0025089 A1 Feb. 28, 2002

(30) Foreign Application Priority Data

Aug. 23, 2000 (JP) ........................................ 2000-252423
Aug. 23, 2000 (JP) ........................................ 2000-252945
May 24, 2001 (JP) ........................................ 2001-155930

(51) Int. Cl.[7] ............................................. F16C 32/06
(52) U.S. Cl. ..................................................... 384/107
(58) Field of Search ................................. 384/100, 107, 384/112

(56) References Cited

U.S. PATENT DOCUMENTS

| 5,357,162 | A | * | 10/1994 | Aiyoshizawa et al. | ........ 310/90 |
| 5,707,154 | A | * | 1/1998 | Ichiyama | ........ 384/107 |
| 6,059,459 | A | * | 5/2000 | Ichiyama | ........ 384/112 |
| 6,155,721 | A | * | 12/2000 | Kurosawa et al. | ........ 384/100 |
| 6,316,857 | B1 | * | 11/2001 | Jeong | ........ 310/90 |
| 6,390,681 | B1 | * | 5/2002 | Nakazeki et al. | ........ 384/107 |
| 6,431,757 | B1 | * | 8/2002 | Nakazeki et al. | ........ 384/107 |

* cited by examiner

*Primary Examiner*—Jack Lavinder
*Assistant Examiner*—Xuan Lan Nguyen
(74) *Attorney, Agent, or Firm*—Arent Fox Kintner Plotkin & Kahn, PLLC

(57) ABSTRACT

The squareness of the both end surfaces of the flange portion with respect to the outer circumference of the shaft portion of the shaft member is set to 0.001 mm or less respectively, and the flatness of both end surfaces of the flange portion is set to 0.001 mm or less respectively. The squareness of the end surface of the bearing member with respect to the inner circumference of the bearing member is set to 0.002 mm or less, and the flatness thereof is set to 0.0015 mm or less. The flatness of the inner surface of the bottom portion of the housing is set to 0.002 mm or less.

14 Claims, 2 Drawing Sheets

HYDRODYNAMIC BEARING UNIT

BACKGROUND OF THE INVENTION

The present invention relates to a hydrodynamic bearing unit. This bearing unit is preferably used particularly for supporting a spindle motor in information apparatus, for example, in a magnetic disk device such as an HDD, an FDD or the like, an optical disk device such as a CD-ROM, a DVD-ROM or the like, and a magneto-optical disk device such as an MD and an MO or the like, or for supporting a spindle in a polygon scanner such as a laser beam printer (LBP) or the like.

In the spindle motor of each kind of the above information apparatus, a higher speed, a lower cost, and a lower noise are demanded in addition to the high rotation precision or the like. One of the key elements that determine these performance requirements is a bearing for supporting a spindle of the motor. In recent years, as this kind of bearing unit, the usage of the hydrodynamic bearing with excellent characteristics is investigated to meet the demanded performance, or the bearing is actually used.

In spindle motors for the above information apparatus in recent years, the high rotation precision is more strongly demanded in an attempt to increase the information recording density and obtain higher speed rotation. In order to meet this demand, still higher rotation precision is demanded with respect to the hydrodynamic bearing incorporated in the above spindle motors.

As a factor which largely affects rotation precision of hydrodynamic bearings, clearance control in a radial bearing clearance and a thrust bearing clearance for generating dynamic pressure is considered important.

The present invention aims at providing a hydrodynamic bearing unit with a high rotation precision wherein clearance control of the radial bearing clearance and the thrust bearing clearance is made appropriate.

Furthermore, an object of the present invention is to suppress the friction of a radial bearing surface and a thrust bearing surface to maintain an excellent bearing performance in the hydrodynamic bearing unit described above.

SUMMARY OF THE INVENTION

The present invention provides a hydrodynamic bearing unit comprising: a shaft member having a shaft portion and a flange portion; a bearing member arranged on an outer circumference of the shaft member; and a radial bearing portion and a thrust bearing portion respectively comprising bearing surfaces with grooves (dynamic pressure grooves) for generating hydrodynamic pressure and bearing clearances facing the bearing surfaces, and supporting the shaft member in non-contact state, in a radial direction and a thrust direction respectively, with hydrodynamic pressure generated in the bearing clearances when the shaft member and the bearing member relatively rotate, wherein the squareness of the both end surfaces of the flange portion with respect to the outer circumference of the shaft portion of the shaft member is 0.001 mm or less respectively, and the flatness of the both end surfaces of the flange portion is 0.001 mm or less respectively.

The "bearing member" in this invention includes a structure in which the bearing member having a radial bearing surface and a thrust bearing surface is fixed to a housing and a structure in which a radial bearing surface and a thrust bearing surface are directly formed on a housing.

In this case, it is desirable that the squareness of the end surface of the bearing member located opposite to one of the both end surfaces of the flange portion via the thrust bearing clearance with respect to the inner circumference of the bearing member is set to 0.002 mm or less while the flatness thereof is set to 0.0015 mm or less. Furthermore, the flatness of the surface located opposite to the other end surface of the flange portion via the thrust bearing clearance is set to 0.002 mm or less.

Furthermore, according to the present invention, in a hydrodynamic bearing unit comprising: a housing with a bottom portion; a bearing member fixed to an inner circumference of the housing; a shaft member having a shaft portion inserted into the inner circumference of the bearing member and a flange portion; a radial bearing portion provided between the inner circumference of the bearing member and the outer circumference of the shaft portion of the shaft member for supporting the shaft member in a radial direction in non-contact state with a dynamic pressure generated in a radial bearing clearance; and a thrust bearing portion respectively provided between each end surface of the flange portion of the shaft member and an end surface of the bearing member or an inner surface of the bottom portion of the housing for supporting the shaft member in a thrust direction in non-contact state with a dynamic pressure generated in the thrust bearing clearances, the flatness of the inner surface and the outer surface of the housing is 0.005 mm or less.

In addition to the above structure, the squareness of the both end surfaces of the flange portion with respect to the outer circumference of the shaft portion of the shaft member can be set to 0.001 mm or less while the flatness of the both end surfaces of the flange portion can be set to 0.001 mm or less. Furthermore, the squareness of the end surface of the bearing member located opposite to one of the both end surfaces of the flange portion via the thrust bearing clearance with respect to the inner circumferential surface of the bearing member can be set to 0.002 mm or less while the flatness thereof can be set to 0.0015 mm or less. Furthermore, the flatness of the inner surface of the bottom portion of the housing can be set to 0.002 mm or less.

Furthermore, the present invention provides a hydrodynamic bearing unit comprising: a housing with a bottom; a bearing member fixed to an inner circumference of the housing; a shaft member having a shaft portion inserted into the inner circumferential surface of the bearing member and a thrust plate provided on the shaft portion; a radial bearing portion provided between the inner circumferential surface of the bearing member and the outer circumferential surface of the shaft portion of the shaft member for supporting the shaft portion in a radial direction in non-contact state with a dynamic pressure action of fluid generated in a radial bearing clearance; and a thrust bearing portion respectively provided between each end surface of the thrust plate of the shaft member and the lower end surface of the bearing member or the bottom surface of the housing for supporting the thrust plate in a thrust direction in non-contact state with a dynamic pressure action of fluid generated in a thrust bearing clearance; wherein the surface hardness of the outer circumferential surface of the shaft portion is larger than that of the inner circumferential surface of the bearing member, the surface hardness of the both end surfaces of the thrust plate is larger than that of the lower end surface of the bearing member and the bottom surface of the housing, the surface roughness of the outer circumferential surface of the shaft portion is smaller than that of the inner circumferential surface of the bearing member, the surface roughness of the both end surfaces of the thrust plate is smaller than that of the lower end surface of the bearing member and the bottom surface of the housing, and the outer circumferential surface of the shaft portion has a surface characteristic on which fine projections constituting the surface roughness is smoothed. The surface with such surface characteristic can be formed through grinding process or the like followed by tumbler process, barrel process or the like. Alternatively the surface can be formed through grinding process or the like followed by relatively sliding process with the slide member with a surface hardness larger than the surface.

In the above structure, preferably, the outer circumferential surface of the shaft portion has a mean square inclination angle Δq, designated in ISO4287/1, of 2.0 or less.

In the above structure, the both end surfaces of the thrust plate can assume a structure in which the both end surfaces of the thrust plate has a surface characteristic on which fine projections constituting the roughness of the surface is smoothed. In this case, the both end surfaces of the thrust plate can have the mean square inclination angle Δq, designated in ISO4287/1, of 2.0 or less.

Furthermore, in the above structure, preferably the outer circumferential surface of the shaft portion has the arithmetic average deviation Ra, designated in ISO4287/1, of 0.04 µm or less, while the both end surfaces of the thrust plate have the arithmetic average deviation Ra, ruled out in ISO4287/1, of 0.04 µm or less, preferably Ra 0.01 µm or less.

DETAILED DESCRIPTION OF THE PREFERRED EMBODIMENTS

Figure 1:
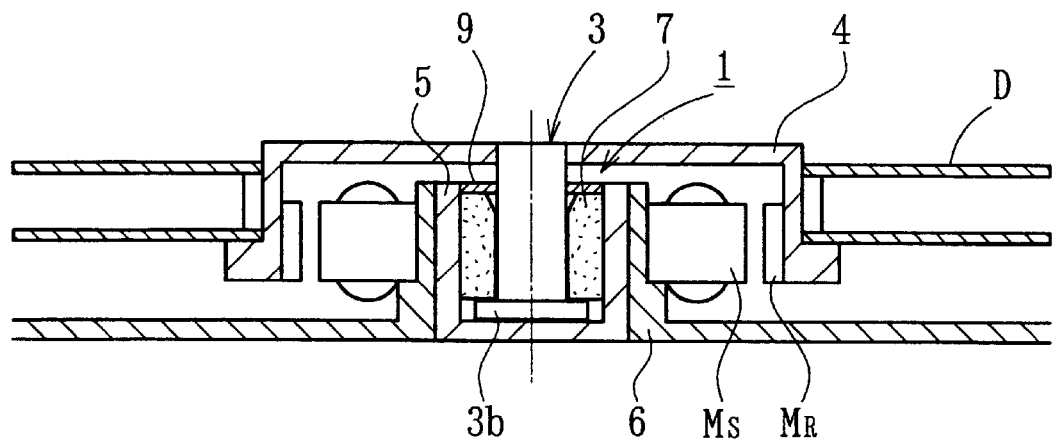
FIG. 1 is a sectional view showing a spindle motor having a hydrodynamic bearing unit according to the present invention.

FIG. 1 is a view showing one example of a structure of a spindle motor for an information apparatus incorporating a hydrodynamic bearing unit 1 according to this embodiment. This spindle motor is used in a disk drive device such as an HDD or the like. The spindle motor comprises the hydrodynamic bearing unit 1 supporting a shaft member 3 such that it can rotate freely in non-contact state, a disk hub 4 attached on then shaft member 3, a motor stator Ms, and a motor rotor Mr. The stator Ms and the rotor Mr are located opposite position via a gap in a radial direction. The stator Ms is attached on the outer circumferential surface of the casing 6 while the rotor Mr is attached on the inner circumferential surface of the disk hub 4. The housing 5 of the hydrodynamic bearing unit 1 is attached on the inner circumferential surface of the casing 6. On the disk hub 4, one or a plurality of disks D such as magnetic disks or the like is/are held. When the stator Ms is electrified, the rotor Mr is rotated with the excitation force between the stator Ms and the rotor Mr, so that the disk hub 4 and the shaft member 3 are integrally rotated.

Figure 2:
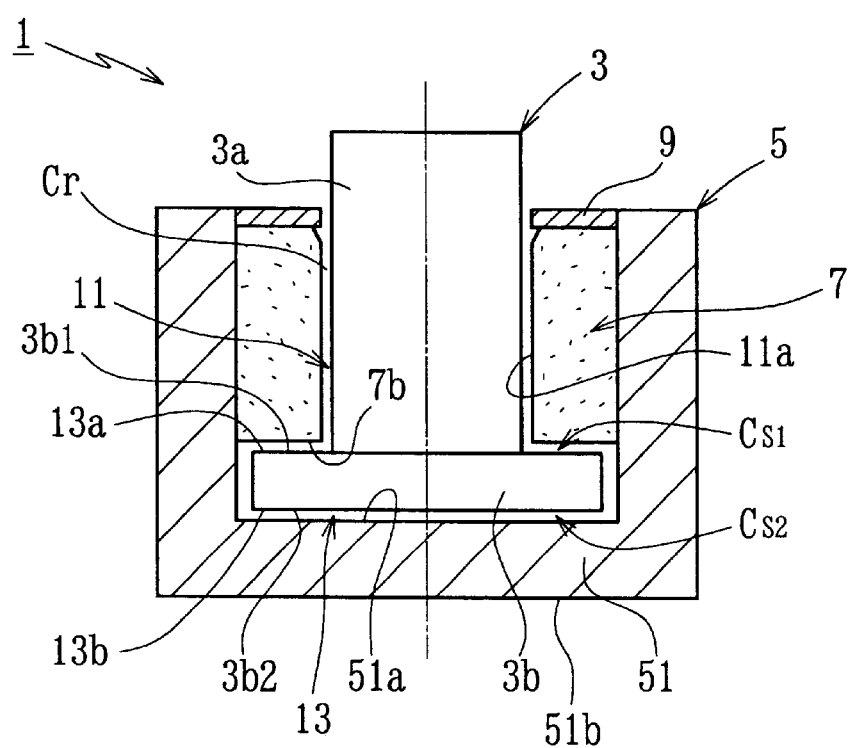
FIG. 2 is a sectional view showing a hydrodynamic bearing unit according to the first embodiment of the present invention.

FIG. 2 is a view showing the first embodiment of the hydrodynamic bearing unit 1. The bearing unit 1 comprises a shaft member 3, a cylindrical housing 5 with a bottom, a bearing member 7 and a sealing member 9 such as a seal washer or the like for sealing one end side of the bearing member 7 (open side of the housing 5) as main constituent elements. The shaft member 3 has a shaft portion 3a, and a flange portion (a thrust plate) 3b provided on one end portion of the shaft portion 3a. The shaft portion 3a is arranged on an inner circumferential surface of the bearing member 7 and the flange portion 3b is arranged between an end surface 7b of the bearing member 7 and a bottom portion 51 of the housing 5. The bottom portion 51 of the housing 5 closes the open portion on one end of the housing 5, and is integrally formed on the housing 5, or may be formed of a separate lid member.

The bearing member 7 is formed of soft metal or sintered metal impregnated with oil or the like. On the inner circumference of the bearing member 7, a radial bearing surface 11a with a plurality of dynamic pressure grooves by transferring, rolling or the like in press process. As a consequence, at the time of the relative rotation of the shaft member 3 and the bearing member 7 (at the time of the rotation of the shaft member 3 in the embodiment), a dynamic pressure of the fluid (for example, lubricating oil) filled in a radial bearing clearance Cr between the radial bearing surface 11a and the outer circumferential surface of the shaft portion 3a is generated. This dynamic pressure action constitutes a radial bearing portion 11 for supporting the shaft portion 3a in a radial direction in non-contact state.

On the both sides of the flange portion 3b, thrust bearing clearances Cs1 and Cs2 which are clearances in an axial direction are provided. The thrust bearing clearance Cs1 is formed between one end surface 3b1 of the flange portion 3b and the end surface 7b of the bearing member 7 located opposite thereto while the other thrust bearing clearance Cs2 is formed between the other end surface 3b2 of the flange portion 3b and the inner surface 51a of the bottom portion 51 of the housing 5. On end surfaces facing the thrust bearing clearances Cs1 and Cs2, for example, on the both end surfaces 3b1 and 3b2 of the flange portion 3b, thrust bearing surfaces 13a and 13b with dynamic pressure grooves for the generation of the hydrodynamic pressure are formed. The dynamic pressure of the fluid is generated in the thrust bearing clearances Cs1 and Cs2 at the time of the above rotation, so that a thrust bearing portion 13 is constituted for supporting the flange portion 3b from both sides in a thrust direction in non-contact state.

The configuration of the dynamic pressure grooves of the radial bearing surface 11a and the thrust bearing surfaces 13a and 13b can be arbitrarily selected. Any of the known herringbone type, spiral type, step type, multiple arc type or the like can be selected, or any of these types can be appropriately combined to be used.

By the way, an HDD, one kind of information apparatus, having tens of thousands of tpi (Track per inch) is being developed for a larger capacity. For example, in the case that an HDD with 20,000 tpi has a distance of 1.27 µm between tracks, about one tenth or less thereof (0.13 µm or less) is demanded as a radial non-repeated run out (NRRO) of the spindle motor.

Figure 3:
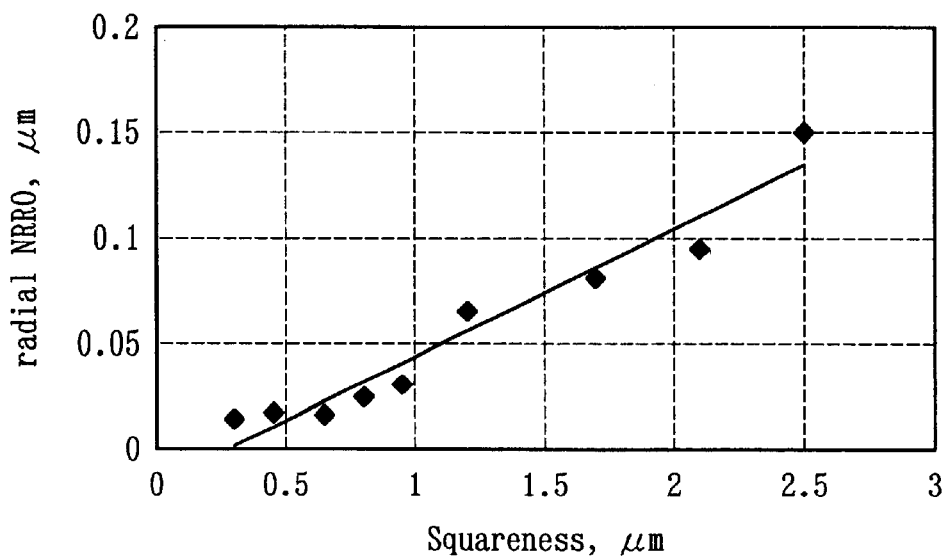
FIG. 3 is a view showing a relation between the squareness of the outer circumference of the shaft portion with respect to the end surface of the flange portion and radial NRRO.

At present, an HDD with 50,000 tpi are put into practical use where 0.05 µm or less is demanded as NRRO. FIG. 3 is a view showing the measurement result of the change in the radial NRRO in the case that the squareness of the outer circumference of the shaft portion 3a and the end surface of the flange portion 3b is made different. According to FIG. 2, in order to suppress the NRRO to 0.05 μm or less, it can be understood that 1 μm or less is required as the squareness. Consequently, it is desired that the squareness of the both end surfaces 3b1 and 3b2 of the flange portion 3b with respect to the outer circumference of the shaft portion 3a of the shaft member 3 is set to 0.001 mm or less respectively (desirably, 0.0005 mm or less).

It is difficult to control the thrust bearing clearance Cs1 to an appropriate value only by regulating the squareness. From this viewpoint, it is desirable to set the flatness of the both end surfaces 3b1 and 3b2 of the flange portion 3b to 0.001 mm or less (desirably, 0.0005 mm or less).

Here, the "squareness" means, in a combination of a predetermined planar surface with a reference surface, a deviation scale on the above predetermined surface from a geometric surface in geometrically right angle with respect to the reference surface. This is represented, for example, by measuring the amplitude (maximum value) of the both end surfaces 3b1 and 3b2 by contacting respective terminals to the both end surfaces 3b1 and 3b2 of the flange portion while rotating the shaft member 3 on an axis center. Furthermore, the "flatness" means a height difference between the maximum convex portion and minimum concave portion on a measurement surface. In the case where dynamic pressure grooves are present on a planar surface which becomes an object in any case, an imaginary surface connecting ridges (projections) between the dynamic pressure grooves is formed as a reference (the same holds true of the following).

The squareness of the end surfaces 7a of the bearing member 7 located opposite to one end surface 3b1 of the both end surfaces 3b1 and 3b2 of the flange portion 3b with respect to the inner circumference of the bearing member 7 is set to 0.002 mm or less (preferably, 0.0015 mm or less) while the flatness of the end surface 7a is set to 0.0015 mm or less (desirably, 0.001 mm or less).

Furthermore, the flatness of the inner surface 51a of the bottom portion 51 located opposite to the other end surface 3b2 of the flange portion 3b via the thrust bearing clearance Cs2 is set to 0.002 mm or less (desirably, 0.0015 mm or less).

The radial bearing clearance Cr and the thrust bearing clearances Cs1 and Cs2 can be secured to an appropriate value by regulating the squareness and the flatness as described above, so that the contact of the shaft portion 3a with the bearing member 7 or the bearing member 7 and the bottom portion 51 with the flange portion 3b in rotating is prevented, and a sufficient dynamic pressure can be generated for supporting the shaft in each bearing clearance, thereby a high rotation precision is attained.

Furthermore, it is possible to secure the assemblage precision at the time of the assemblage of the bearing unit 1 by setting the parallelism between the inner surface 51a and the outer surface 51b of the bottom portion 51 to 0.005 mm or less (desirably, 0.003 mm or less).

Here, the "parallelism" means, assuming one of two planar surfaces to be parallel each other as a reference surface, a deviation scale of the other surface from a geometric surface geometrically parallel to the reference surface.

As described above, the radial bearing clearance and the thrust bearing clearances are secured to an appropriate value by controlling the squareness and the flatness of each portion within a predetermined value so that an unstable rotation resulting from the mutual contact of the bearing surfaces and the shortage of the dynamic pressure in the bearing clearances is prevented, thereby it is possible to suppress torque loss and torque change to obtain a high rotation precision.

Furthermore, the assemblage precision at the time of assemblage can be secured by controlling the parallelism of the inner surface and the outer surface of the housing to a predetermined value.

Figure 4:
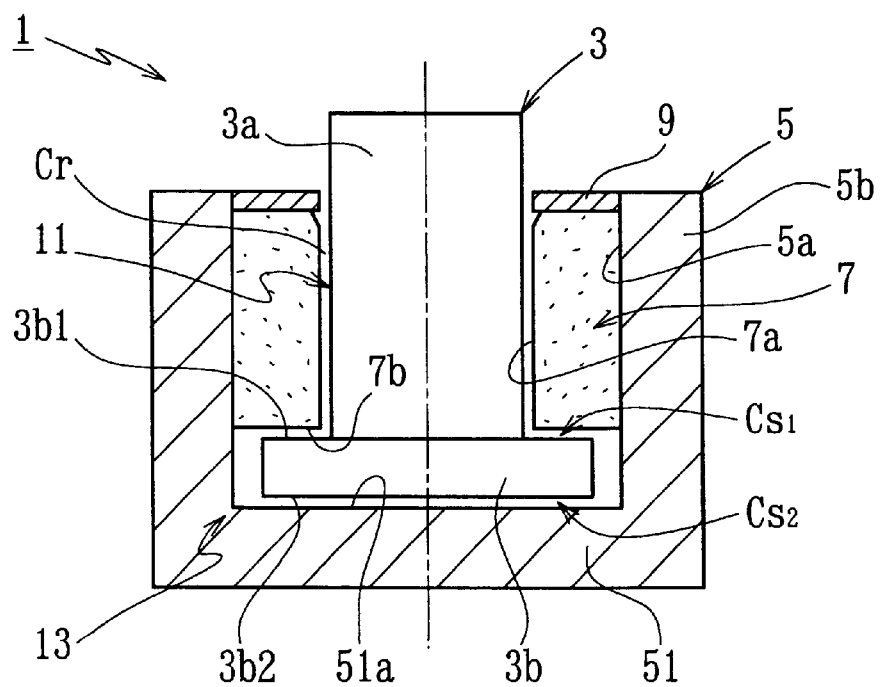
FIG. 4 is a sectional view showing a hydrodynamic bearing unit according to the second embodiment of the present invention.

FIG. 4 is a view showing the second embodiment of the hydrodynamic bearing unit 1. The hydrodynamic bearing unit 1 comprises a housing 5 with a bottom having a cylindrical inner circumferential surface 5a, a cylindrical bearing member 7 fixed to the inner circumferential surface 5a of the housing 5, a shaft member 3, and a sealing member 9 for shielding the upper end surface side (open side of the housing 5) of the bearing member 7 as its main constituent elements.

The housing 5 is formed of, for example, brass and comprises a cylindrical side portion 5b and a bottom portion 51. In this embodiment, the side portion 5b and the bottom portion 51 of the housing 5 are integrally constituted, but they may be constituted in a separate structure.

The shaft member 3 is formed of, for example, stainless steel (SUS420J2) or the like, and comprises the shaft portion 3a, and the flange portion 3b (a thrust plate ) integrally or separately provided on the shaft portion 3a. The shaft portion 3a is inserted into the inner circumferential surface 7a of the bearing member 7 with a predetermined radial bearing clearance Cr, and the thrust plate 3b is accommodated into the space portion between the lower end surface 7b of the bearing member 7 and the bottom surface 7c of the housing 5. Thrust bearing clearances Cs1 and Cs2 are respectively provided between the upper end surface 3b1 of the thrust plate 3b and the lower end surface 7b of the bearing member 7 and between the lower end surface 3b2 of the thrust plate 3b and the bottom surface 51a of the housing 5.

The bearing member 7 is formed of, for example, a porous material, in particular, sintered metal of copper and iron. Lubricating oil or lubricating grease is impregnated into the inside pores to provide impregnated oil bearing. Plural dynamic pressure grooves are formed in a region constituting a radial bearing surface of the inner circumferential surface 7a of the bearing member 7. When the bearing member 2 is rotated, a dynamic pressure action is generated in the radial bearing clearance Cr, so that the shaft portion 3a of the shaft member 3 is supported in a radial direction so as to rotate freely in non-contact state, with the oil film of the lubrication oil formed in the radial bearing clearance Cr. As a consequence, a radial bearing portion 11 is constituted for supporting the shaft member 3 in a radial direction such that it can rotate freely in non-contact state. The dynamic pressure groove may be formed on the outer circumference of the shaft portion 3a of the shaft member 3.

A dynamic pressure groove is formed respectively on regions of the upper end surface 3b1 of the thrust plate 3b or the lower end surface 7b of the bearing member 7, and the lower end surface 3b2 of the thrust plate 3b or the bottom surface 51a of the housing 5, which become the thrust bearing surfaces. When the shaft member 3 is rotated, a dynamic pressure action is generated in the thrust bearing clearance Cs1 and Cs2, so that the thrust plate 3b of the shaft member 3 is supported in a thrust direction so as to rotate freely in non-contact state, with the oil film of the lubricating oil formed in the thrust bearing clearance Cs1 and Cs2, As a consequence, the thrust bearing portion 13 is constituted for supporting the shaft member 3 in a thrust direction such that it can rotate in non-contact state.

The configuration of the dynamic pressure groove of the radial bearing surface and the thrust bearing surface can be arbitrarily selected, so that any of the known herringbone type, spiral type, step type, and multiple arc type is selected or such types are appropriately combined and used.

In the above structure, the surface hardness of the outer circumference surface of the shaft portion 3a is larger than that of the inner circumferential surface 7a of the bearing member 7 while the surface hardness of the both end surfaces 3b1 and 3b2 of the thrust plate 3b is larger than that of the lower end surface 7b of the bearing member 7 and the bottom surface 51a of the housing 5. For example, the shaft member 3 is subjected to surface hardening process such as plating process, carbonation, nitration, carbo-nitration or other thermal process, so that the surface hardness of the outer circumferential surface of the shaft portion 3a and the both end surfaces 3b1 and 3b2 of the thrust plate 3b is adjusted to Vickers hardness HV of 500 or more, preferably about HV of 500 through 550.

Furthermore, the surface roughness of the outer circumferential surface of the shaft portion 3a is smaller than that of the inner circumferential surface 7a of the bearing member 7 while the surface roughness of the both end surfaces 3b1 and 3b2 of the thrust plate 3b is smaller than that of the lower end surface 7b of the bearing member 7 and the bottom surface 51a of the housing 5. In this embodiment, the outer circumferential surface of the shaft portion 3a and the both end surfaces 3b1 and 3b2 of the thrust plate 3b are finished with cutting process such as grinding process or the like after surface hardening process, and thereafter tumbler process or barrel process is conducted, so that fine projections (fine projections constituting the roughness of these surfaces) on the outer circumferential surface of the shaft portion 3a and the both end surfaces 3b1 and 3b2 of the thrust plate 3b are smoothed. As a consequence, in this embodiment, each mean square inclination angle $\Delta q$, designated in ISO4287/1, of the outer circumferential surface of the shaft portion 3a and the both end surfaces 3b1 and 3b2 of the thrust plate 3b is set to 2.0 or less. Furthermore, in this embodiment, the arithmetic average deviation Ra, designated in ISO4287/1, of the outer circumferential surface of the shaft portion 3a is set to 0.04 $\mu$m or less while the arithmetic average deviation Ra of the both end surfaces 3b1 and 3b2 of the thrust plate 3b is 0.04 $\mu$m or less, preferably 0.01 $\mu$m.

The smoothing process of the fine projections is conducted only on the outer circumferential surface of the shaft portion 3a while the both end surfaces 3b1 and 3b2 of the thrust plate 3b may be subjected to cutting process such as grinding process or the like. In that case, for example, when the both end surfaces 3b1 and 3b2 of the thrust plate 3b are subjected to cutting process, the outer circumferential surface of the shaft portion 3a of the shaft member 3 is supported with a shoe whose surface hardness is larger than that of the surface (for example, a shoe formed of hard material such as superhard alloy, combacs or the like), and the shaft portion 3a is relatively slided with respect to the shoe, so that the surface projection of the outer circumferential surface of the shaft portion 3a can be smoothed. Furthermore, in this case, it is preferable that the surface roughness of the both end surfaces 3b1 and 3b2 of the thrust plate 3b are made smaller than that of the outer circumferential surface of the shaft portion 3a, and, for example, the arithmetic average deviation Ra is set to 0.01 $\mu$m or less.

As described above, according to the present invention, friction on the radial bearing surface constituting the radial bearing portion and the thrust bearing surface constituting the thrust bearing portion is suppressed, so that the excellent bearing performance of the hydrodynamic bearing unit of this type can be maintained over a long period.

What is claimed is:

1. A hydrodynamic bearing unit comprising:

a housing with a bottom portion;

a bearing member fixed to the inner circumference of the housing;

a shaft member having a shaft portion inserted into the inner circumference of the bearing member, and a flange portion;

a radial bearing portion provided between the inner circumference of the bearing member and the outer circumference of the shaft portion of the shaft member for supporting the shaft member in a radial direction in non-contact state with a dynamic pressure generated in a radial bearing clearance; and a thrust bearing portion respectively provided between each end surface of the flange portion of the shaft member and an end surface of the bearing member or an inner surface of the bottom portion of the housing for supporting the shaft member in a thrust direction in non-contact state with a dynamic pressure generated in thrust bearing clearances;

wherein the parallelism between the inner surface and the outer surface of the housing is 0.005 mm or less.

2. The dynamic pressure bearing unit according to claim 1, wherein the squareness of the both end surfaces of the flange portion with respect to the outer circumference of the shaft portion of the shaft member is respectively 0.001 mm or less, and the flatness of the both end surfaces of the flange portion is 0.001 mm or less.

3. The hydrodynamic bearing unit according to claim 1, wherein the squareness of the end surface of the bearing member located opposite to one of the both end surfaces of the flange portion via the thrust bearing clearance with respect to the inner circumference of the bearing member is 0.002 mm or less, and the flatness thereof is 0.0015 mm or less.

4. The hydrodynamic bearing unit according to claim 2, wherein the squareness of the end surface of the bearing member located opposite to one of the both end surfaces of the flange portion via the thrust bearing clearance with respect to the inner circumference of the bearing member is 0.002 mm or less, and the flatness thereof is 0.0015 mm or less.

5. The hydrodynamic bearing unit according to any of claims 1 through 4, wherein the flatness of the inner surface of the bottom portion of the housing is 0.002 mm or less.

6. A hydrodynamic bearing unit comprising:

a housing with a bottom;

a bearing member fixed to an inner circumference of said housing;

a shaft member having a shaft portion inserted into the inner circumferential surface of said bearing member and a thrust plate provided on said shaft portion;

a radial bearing portion provided between the inner circumferential surface of said bearing member and an outer circumferential surface of the shaft portion of said shaft member for supporting said shaft portion in a radial direction in non-contact state with a dynamic pressure action of fluid generated in a radial bearing clearance; and a thrust bearing portion respectively provided between each end surface of said thrust plate of the shaft member and the lower end surface of said bearing member or the bottom surface of said housing for supporting said thrust plate in a thrust direction in non-contact state with a dynamic pressure action of fluid generated in a thrust bearing clearance;

wherein the surface hardness of the outer circumferential surface of said shaft portion is larger than that of the inner circumferential surface of said bearing member, the surface hardness of the both end surfaces of said thrust plate is larger than that of the lower end surface of said bearing member and the bottom surface of said housing, the surface roughness of the outer circumferential surface of said shaft portion is smaller than that of the inner circumferential surface of said bearing member, the surface roughness of the both end surfaces of said thrust plate is smaller than that of the lower end surface of said bearing member and the bottom surface of said housing, and said outer circumferential surface of said shaft portion has a surface characteristic on which fine projections constituting the surface roughness is smoothed.

7. The hydrodynamic bearing unit according to claim 6, wherein the mean square inclination angle $\Delta q$ of the outer circumferential surface of said shaft portion is 2.0 or less.

8. The hydrodynamic bearing unit according to claim 6, wherein the both end surfaces of said thrust plate has a surface characteristic on which fine projections constituting the surface roughness is smoothed.

9. The hydrodynamic bearing unit according to claim 7, wherein the both end surfaces of said thrust plate has a surface characteristic on which fine projections constituting the surface roughness is smoothed.

10. The hydrodynamic pressure bearing unit according to claim 8, wherein the means square inclination angle $\Delta q$ of the both end surfaces of said thrust plate is 2.0 or less.

11. The hydrodynamic pressure bearing unit according to claim 9, wherein the mean square inclination angle $\Delta q$ of the both end surfaces of said thrust plate is 2.0 or less.

12. The hydrodynamic bearing unit according to any of claims 6 through 11, wherein the arithmetic average deviation Ra of the outer circumferential surface of said shaft portion is 0.04 $\mu$m or less.

13. The hydrodynamic bearing unit according to any of claims 6 through 11, wherein the arithmetic average deviation Ra of the both end surfaces of said thrust plate is 0.04 $\mu$m or less.

14. The hydrodynamic bearing unit according to claim 12, wherein the arithmetic average deviation Ra of the both end surfaces of said thrust plate is 0.04 $\mu$m or less.

* * * * *